C. A. STOUFFER.
STARTING DEVICE FOR INTERNAL COMBUSTION ENGINES.
APPLICATION FILED MAR. 29, 1913.

1,169,366.

Patented Jan. 25, 1916.

WITNESSES

INVENTOR
Cyrus A. Stouffer,
Attorney

UNITED STATES PATENT OFFICE.

CYRUS A. STOUFFER, OF DAYTON, PENNSYLVANIA.

STARTING DEVICE FOR INTERNAL-COMBUSTION ENGINES.

1,169,366. Specification of Letters Patent. Patented Jan. 25, 1916.

Application filed March 29, 1913. Serial No. 757,646.

*To all whom it may concern:*

Be it known that I, CYRUS A. STOUFFER, a citizen of the United States, residing at Dayton, in the county of Armstrong and State of Pennsylvania, have invented certain new and useful Improvements in Starting Devices for Internal-Combustion Engines, of which the following is a specification.

This invention relates to starting devices for internal combustion engines such as are used in automobiles or the like and more particularly to a device of this nature in which only mechanical means are employed.

The primary object of this invention is the production of a practical and efficient starting mechanism for internal combustion engines especially those used on automobiles, that can be conveniently and effectually operated by the chauffeur from the seat of the vehicle and which will enable him to start the engine quickly, easily and safely.

Another object of this invention is to construct a device of this nature in such a manner, that after the engine has been started the starting mechanism may be released, allowing the engine to run free without imparting motion to the starting mechanism and also to provide a mechanism so constructed that all danger of accidents caused by the back-firing of the engine will be eliminated.

With the foregoing and other objects in view, this invention consists in such novel features of construction, combination and arrangement of parts as will be hereinafter more fully described, illustrated in the accompanying drawings, and claimed.

Figure 1:
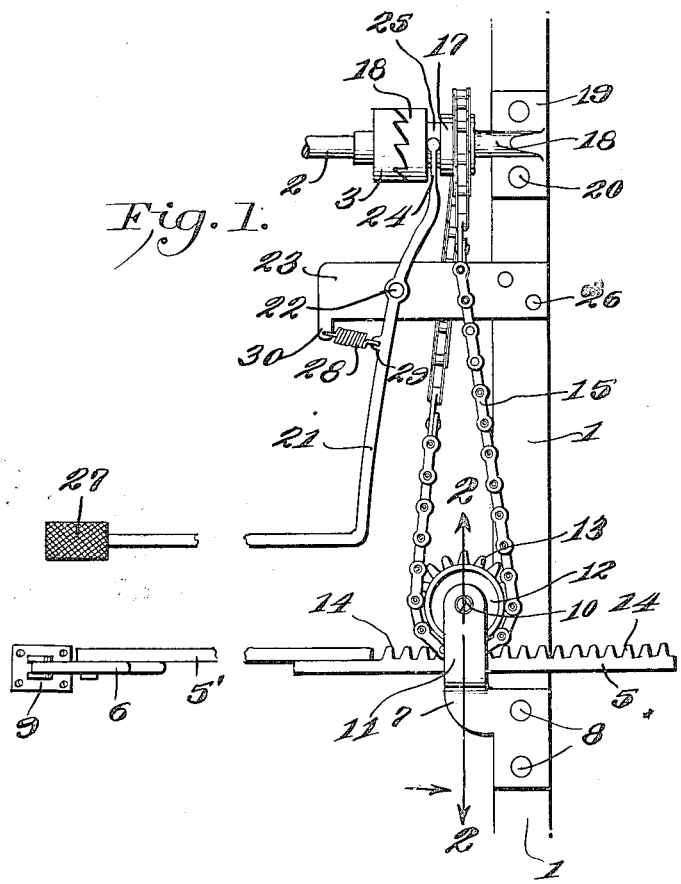
Figure 2:
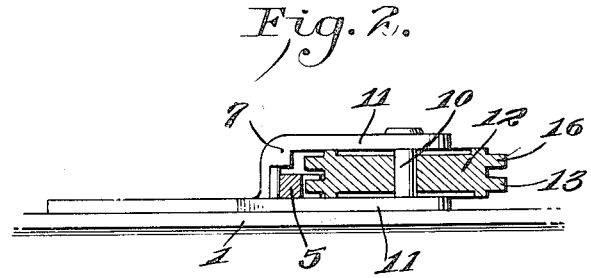

In describing the invention in detail, reference will be had to the accompanying drawings wherein like characters of reference designate like or corresponding parts throughout the several views, and in which, Figure 1 is a view showing the improved starting mechanism applied to a fragment of an automobile; and, Fig. 2 is a detail sectional view taken on the line 2—2 of Fig. 1.

In referring to the drawings by numeral, 1 designates a fragment of the frame of an automobile or the like which is propelled by an internal combustion engine (not shown) and the numeral 2 designates a portion of the crank shaft of the engine (not shown) which has a clutch mechanism 3 mounted upon its outer end.

A rack bar 5 which is connected to a lever 6 by means of a bar 5' is mounted upon a bracket 7 which is secured to the frame 1 by any suitable means as at 8. The lever 6 has a hand or foot rest 9 pivotally mounted upon its outer end, which foot rest extends through the front of the automobile into a position so that it may be easily reached by the foot of the chauffeur while he is seated upon the seat of the vehicle. Removably mounted upon a pin 10 which is mounted within the bifurcated portion 11 of the bracket 7 is a combined gear and sprocket wheel 12. The wheel 12 has separate sets of teeth formed upon its periphery, one set 13 of which engages the teeth 14 upon the rack bar 5 while a sprocket chain 15 is mounted upon the teeth 16 of the wheel and upon a sprocket wheel 17 which is mounted upon a shaft 18. The shaft 18 is rigidly mounted upon the frame 1 by means of a bracket 19. The sprocket wheel 17 has a clutch member 18 formed integral therewith which engages the clutch member 3 upon the end of the shaft 2 of the engine (not shown) for the starting of the engine. The clutch mechanism 18 is controlled by means of a lever 21 which is pivoted at 22 to a bracket 23, and which has its upper bifurcated end 24 seated in an annular recess 25 in the shank or hub of the sprocket wheel 17.

The bracket 23 is rigidly mounted upon the frame 1 in any suitable manner as at 26. The lever 21 has a foot rest 27, which is located in a position to be conveniently reached by the chauffeur from the seat of the machine, secured to its outer end and also a coil spring 28 attached to a projection 29 on the lever 21 and to an extension 30 upon the bracket 23. This coil spring 28 tends to hold the clutch member 18 out of engagement with the clutch member 3, thereby allowing the engine to run freely without imparting motion to the starting mechanism when pressure is removed from the foot rest 27 of the lever 21.

The sprocket chain 15 is twisted as is clearly shown in Fig. 1 of the drawings in order to decrease the amount of space taken up by the starting mechanism as well as to permit of the operating of the shaft 2 of the engine (not shown) when the engine is disposed at right angles to the longitudinal lines of the automobile or other vehicle. This feature may not be necessary in all instances and it is to be understood that it may be eliminated when so desired without departing from the spirit of this invention.

By imparting pressure upon the foot rest 9 and the lever 6 the rack 5 will be caused to slide within its bearing in the bracket 7 and thus impart rotary motion to the combination gear and sprocket wheel 12. This rotation of the wheel 12 will through the medium of the sprocket chain 15 impart rotary motion to the sprocket wheel 17 and to the clutch mechanism 18 which is formed integral with the sprocket wheel 17, thus when the lever 27 is pressed downwardly so as to cause the clutch member 18 to engage the clutch member 3 the rotary motion of the sprocket wheel 17 will be imparted to the shaft 2 of the engine. This will cause the same to rotate and start it upon its cycle of operations thus serving the purpose of cranking the engine and permitting the same to be easily, quickly, and efficiently started from the seat of the vehicle.

In practical fields, certain minor features of construction, combination and arrangement of parts may necessitate alterations to which the patentee is entitled provided such alterations are comprehended within the scope of what is claimed.

What is claimed is:—

A starting mechanism comprising in combination a frame, a main shaft rotatably mounted in the frame, a sprocket wheel carried by said shaft, a substantially U-shaped bracket secured to the frame, the inner wall of said bracket recessed adjacent one of the vertical arms to provide a guideway, a rotatable member supported between the vertical arms of the bracket, said member having a double row of teeth, one of which is in vertical alinement with the guideway, means operable in the guideway and engaging said row of teeth for imparting movement thereto, and flexible means connecting the second row of teeth with the said sprocket wheel.

In testimony whereof I affix my signature in presence of two witnesses.

CYRUS A. STOUFFER.

Witnesses:
W. C. MARSHALL,
C. A. ALLEN.